United States Patent
Ono (10) Patent No.: US 8,042,328 B2
(45) Date of Patent: Oct. 25, 2011

(54) EXHAUST GAS PURIFIER

(75) Inventor: Taisuke Ono, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 1042 days.

(21) Appl. No.: 11/909,759

(22) PCT Filed: Mar. 14, 2006

(86) PCT No.: PCT/JP2006/304997
§ 371 (c)(1),
(2), (4) Date: Sep. 26, 2007

(87) PCT Pub. No.: WO2006/103915
PCT Pub. Date: Oct. 5, 2006

(65) Prior Publication Data
US 2009/0013674 A1   Jan. 15, 2009

(30) Foreign Application Priority Data

Mar. 29, 2005   (JP) .................................. 2005-093803

(51) Int. Cl.
*F01N 3/10* (2006.01)
*F01N 3/00* (2006.01)

(52) U.S. Cl. ................ 60/301; 60/286; 60/295; 60/297; 60/288

(58) Field of Classification Search .............. 60/286, 60/295, 301
See application file for complete search history.

(56) References Cited

U.S. PATENT DOCUMENTS

2003/0066287 A1*   4/2003   Hirota et al. .................... 60/297
2003/0167756 A1    9/2003   Szymkowicz

FOREIGN PATENT DOCUMENTS

CN           1270272 A       10/2000
(Continued)

OTHER PUBLICATIONS

International Search Report dated Jun. 20, 2006 with English translation (Four (4) Pages).

(Continued)

*Primary Examiner* — Thomas Denion
*Assistant Examiner* — Michael Carton
(74) *Attorney, Agent, or Firm* — Crowell & Moring LLP (57) ABSTRACT

The present invention provides an exhaust gas purifier capable of appropriately purifying harmful components discharged even from an internal combustion engine or a combustion instrument operated mainly in excess-air conditions. Particularly, the exhaust gas purifier is capable of appropriately removing nitrogen oxides, particulate matters including soot, etc. and in addition, capable of maintaining its purification capability without reduction. the exhaust gas purifier has, in the exhaust passage (2) of an internal combustion engine (1), a nitrogen oxide adsorbent (4) for temporarily adsorbing nitrogen oxides and desorbing the adsorbed nitrogen oxides in a temperature-increased environment or a reducing environment, an adsorbed substance desorbing means (3) being disposed on an exhaust gas upstream side of the nitrogen oxide adsorbent (4), the adsorbed substance desorbing means (3) heating the exhaust gas or air or converting the exhaust gas or air into a reducing atmosphere, a combustion apparatus (5) being disposed on an exhaust gas downstream side of the nitrogen oxide adsorbent (4), the combustion apparatus (4) including air supply means (15), fuel supply means (6), and ignition means (7); and a filter apparatus (40) being disposed on an exhaust gas downstream side of the combustion apparatus (5) to be able to capture a particulate substance contained in the exhaust gas.

4 Claims, 5 Drawing Sheets

FOREIGN PATENT DOCUMENTS

| | | | |
|---|---|---|---|
| EP | 1632654 | A1 * | 3/2006 |
| JP | 10-274085 | A | 10/1998 |
| JP | 2001-329835 | A | 11/2001 |
| JP | 2001-330230 | A | 11/2001 |
| JP | 2003-27927 | A | 1/2003 |
| JP | 2004-36405 | A | 2/2004 |

OTHER PUBLICATIONS

The Extended European Search Report dated Aug. 6, 2010 (Six (6) pages).

* cited by examiner

EXHAUST GAS PURIFIER

TECHNICAL FIELD

The present invention relates to an apparatus for purifying exhaust gas of an internal combustion engine such as a diesel engine, a gas engine, a gasoline engine, and a gas turbine engine or a combustion device such as an incinerator and a boiler. More particularly, the present invention relates to an exhaust gas purifier installed within an exhaust gas passage and mainly removing nitrogen oxide and the like.

BACKGROUND ART

A target substance subject to exhaust gas purification is a particulate matter such as nitrogen oxide, carbon monoxide, unburned hydrocarbon, soot and the like. Various apparatuses for purifying these substances have been conventionally developed.

As an apparatus for reducing the nitrogen oxide (NOx), a denitration apparatus or the like has come into practical use, in which a reduction catalyst using an ammonia or an urea as a reducing agent is installed in an exhaust passage, thereby selectively reducing the nitrogen oxide. Further, in a comparatively compact gas engine or an automotive gasoline engine, there has been developed a three-way catalyst which can simultaneously decompose three elements comprising the nitrogen oxide, the carbon monoxide (CO) and the unburned hydrocarbon (HC), and the three-way catalyst contributes to an effective purification of the exhaust gas.

However, it has been known that the three-way catalyst effectively achieves a purifying operation in the case that the three-way catalyst is operated at a theoretical air fuel ratio or within a range close thereto, but is not effectively operated under the other conditions, particularly in exhaust gas in which air (oxygen) is excess. In order to cope with this, in the gas or gasoline engine operated in the excess air state, a nitrogen oxide occluding catalyst system has come into practical use, which temporarily occludes the nitrogen oxide in an occluding agent at a time of being operated under the excess air (oxygen) condition, and next discharges and reduces the occluded nitrogen oxide by being operated under the excess fuel condition.

However, there has been known that in the nitrogen oxide occluding catalyst system, the catalyst is poisoned by sulfur oxide (SOx) in the exhaust gas derived from a sulfur component in a fuel, and a purifying capacity of the nitrogen oxide is rapidly reduced, and the nitrogen oxide occluding catalyst system is used only in the engine using a low sulfur containing fuel in an actual condition. There has been developed a purifier (Patent Document 1) having a structure which reduces nitrogen oxide adsorbed to the occluding substance and discharging the sulfur oxide or the like, by occluding the nitrogen oxide using the occluding substance in a nitrogen oxide purifying tower and burning the nitrogen oxide in the nitrogen oxide purifying tower. However, because the structure is made such as to burn within the purifying tower having the occluding substance built-in, a durability of the occluding substance becomes actually problematic.

For removing a particulate substance such as the soot, an electric precipitator and a DPF come into practical use. The DPF is structured such as to capture the particulate substance by a filter, and burns and removes the captured particulate substance by an electric heater or the like. There has been recently developed a DPF in which a catalyst component having an oxidizing operation is carried in a fine particle filter, and the particulate substance can be continuously removed.

Patent Document 1: Japanese Patent Publication Laid-Open No. 2003-27927

DISCLOSURE OF THE INVENTION

Problems to be Solved by the Invention

The three-way catalyst cannot exert a catalyst function in the internal combustion engine or the combustion instrument equipment operated under the excessive air condition, as has been already explained. Further, in the nitrogen oxide occluding catalyst system coming into practical use in a compact gas engine or an automotive gasoline engine, it is difficult to effectively achieve the purifying capacity in the exhaust gas containing the sulfur oxide or the particulate substance.

In the industrial internal combustion engine, the combustion instrument and a marine internal combustion engine, most of them are operated under the excessive air condition, and the fuel containing the sulfur component is used. Accordingly, a lot of sulfur oxide and particulate substance are contained in the exhaust gas, and there is a need of an exhaust gas purifier which can sufficiently achieves a performance under the exhaust gas mentioned above.

Note that the denitration apparatus selectively reducing the nitrogen oxide by using ammonia, urea, and the like is applied to a relatively large industrial internal combustion engine or combustion instrument. However, the apparatus itself is large and extremely expensive, and a maintenance cost of the reducing agent such as ammonia and urea is also increased. Further, there is a great possibility that the unconsumed ammonia is discharged in the atmospheric air.

Object of the Invention

An object of the invention is to provide an exhaust gas purifier which can properly remove exhausted harmful components even in internal combustion engine or combustion instrument mainly operated under the excess air condition.

Particularly, the object of the invention is to be able to properly remove the nitrogen oxide, the particulate substance such as the soot, the carbon monoxide, and the unburned hydrocarbon in the exhaust gas to maintain a purifying capacity of the exhaust gas purifier without lowering the purifying capacity, or to be able to properly remove the nitrogen oxide, the sulfur oxide, and the like in the exhaust gas to maintain a purifying capacity of the exhaust gas purifier without lowering the purifying capacity even in the fuel containing the sulfur component.

A first aspect according to the invention provides an exhaust gas purifier which is displaced in an exhaust passage of an internal combustion engine or a combustion instrument, the exhaust gas purifier characterized by including a nitrogen oxide adsorbent which temporarily adsorbs nitrogen oxide and desorbs the adsorbed nitrogen oxide by heating or reducing atmosphere; adsorbed substance desorbing means which is disposed on an exhaust gas upstream side of the nitrogen oxide adsorbent, the adsorbed substance desorbing means heating the exhaust gas or air or converting the exhaust gas or air into a reducing atmosphere; a combustion apparatus which is disposed on an exhaust gas downstream side of the nitrogen oxide adsorbent, the combustion apparatus including air supply means, fuel supply means, and ignition means; and a filter apparatus which is disposed on an exhaust gas downstream side of the combustion apparatus to be able to capture a particulate substance contained in the exhaust gas, wherein the nitrogen oxide adsorbent, the adsorbed substance desorbing means, the combustion apparatus, and the filter apparatus are provided in the exhaust passage.

According to the first aspect of the invention, following working-effects are obtained.

During the normal operation of the internal combustion engine or the like, the adsorbed substance desorbing means and the combustion apparatus are stopped, and the nitrogen oxide in the exhaust gas is adsorbed to and removed by the nitrogen oxide adsorbent and the particulate substance contained in the exhaust gas is captured by the filter apparatus in the exhaust passage.

When the adsorbing amount of the nitrogen oxide adsorbent or the capturing amount of the filter apparatus reaches a predetermined amount (for example, saturated amount), the adsorbed substance desorbing means and the combustion apparatus are operated to perform the regenerating operation. In the nitrogen oxide adsorbent, the adsorbed nitrogen oxide is desorbed by the adsorbed substance desorbing means. The desorbed nitrogen oxide is delivered to the combustion apparatus, and then appropriately reduced and removed by the combustion apparatus. In the filter apparatus, the captured particulate substance is burned and removed by combustion means.

At this point, usually the nitrogen oxide adsorbent differs from the filter apparatus in the saturated amount and the regenerating conditions such as a time and a temperature. Accordingly, in the present invention, both the adsorbed substance desorbing means and the combustion apparatus are operated, for example, the regeneration of the nitrogen oxide adsorbent and the regeneration of the filter apparatus are simultaneously performed according to the regenerating conditions of the nitrogen oxide adsorbent, and the adsorbed substance desorbing means can be stopped while only the combustion means is operated to regenerate the filter apparatus in the case where the filter apparatus is insufficiently regenerated due to the difference in regenerating conditions between the nitrogen oxide adsorbent and the filter apparatus or the like. At this point, the particulate substance can be removed efficiently and substantially completely by operating the combustion apparatus according to the regenerating conditions of the filter apparatus. Accordingly, the nitrogen oxide adsorbent and the filter apparatus are appropriately regenerated and maintained without decreasing the purifying ability. In addition, the fuel cost is also saved.

In the exhaust gas purifier according to the first aspect of the invention, a second aspect of the invention is characterized in that the exhaust passage is branched into a plurality of branch exhaust passages, blocking means for being able to block gas flow is provided in an exhaust gas inlet of each branch exhaust passage, each branch exhaust passage includes the nitrogen oxide adsorbent, the adsorbed substance desorbing means, the combustion apparatus, and the filter apparatus, and the adsorbed substance desorbing means includes air supply means and is configured to heat air from the air supply means or to convert the air into the reducing atmosphere.

According to the second aspect of the invention, the exhaust gas is caused to flow into at least one branch exhaust passage from the internal combustion engine or the like, and the exhaust gas can be blocked in other branch exhaust passages to perform the regenerating operation. The exhaust gas is blocked in the branch exhaust passage in which the regenerating operation is performed, so that the air amount can freely set irrespective of the exhaust gas amount in the adsorbed substance desorbing means and the air supply means of each combustion apparatus. Accordingly, the air amount of the branch exhaust gas passage in a regenerating operation state can be set less independently of the branch exhaust gas passage in a normal operation state, the energy (the fuel flow rate) consumed for desorbing the nitrogen oxide from the nitrogen oxide adsorbent and the fuel flow rate supplied to the combustion apparatus can be set less, and saving of the fuel cost can be achieved.

A third aspect according to the invention provides an exhaust gas purifier which is displaced in an exhaust passage of an internal combustion engine or a combustion instrument, the exhaust gas purifier characterized in that the exhaust passage branch exhaust passage is branched into a plurality of branch exhaust passages, blocking means for being able to block gas flow are provided at an exhaust gas inlet and an exhaust gas outlet of the branch exhaust passage, a nitrogen oxide adsorbent, an adsorbed substance desorbing means, a combustion apparatus, a filter apparatus, and an atmospheric air releasing portion are provided between the blocking means at the exhaust gas inlet and exhaust gas outlet of the branch exhaust passage, the nitrogen oxide adsorbent temporarily adsorbing nitrogen oxide and desorbing the adsorbed nitrogen oxide by heating or reducing atmosphere, the adsorbed substance desorbing means being disposed on an exhaust gas downstream side of the nitrogen oxide adsorbent, the adsorbed substance desorbing means including air supply means while heating air from the air supply means or converting the air into a reducing atmosphere, the combustion apparatus being disposed on an exhaust gas upstream side of the nitrogen oxide adsorbent, the combustion apparatus including air supply means, fuel supply means, and ignition means, the filter apparatus being disposed on an exhaust gas upstream side of the combustion apparatus to be able to capture a particulate substance contained in the exhaust gas, the atmospheric air releasing portion being disposed on an exhaust gas upstream side of the filter apparatus to open the branch exhaust passage to an atmosphere, and when the adsorbed substance desorbing means and the combustion apparatus are operated to perform a regenerating operation, the exhaust gas inlet and exhaust gas outlet of the branch exhaust passage are blocked by the blocking means, the branch exhaust passage is opened by the atmospheric air releasing portion, and gas generated by the regenerating operation is caused to flow in a direction opposite an exhaust gas flowing direction and discharged from the atmospheric air releasing portion.

According to the third aspect of the invention, following working-effects are obtained.

During the normal operation of the internal combustion engine or the like, in the branch exhaust passage in which the exhaust gas flows, the adsorbed substance desorbing means and the combustion apparatus are stopped, the particulate substance contained in the exhaust gas is captured by the filter apparatus, and the nitrogen oxide in the exhaust gas is adsorbed to and removed by the nitrogen oxide adsorbent. Accordingly, the nitrogen oxide adsorbent is hardly clogged with the particulate substance, and a decrease in adsorption of the nitrogen oxide adsorbent can be prevented.

In the case where the adsorbing amount of the nitrogen oxide adsorbent or sulfur oxide adsorbent reaches a predetermined amount (for example, saturated amount), the regenerating operation can be performed in each adsorbent. During the regenerating operation, the adsorbed substance desorbing means and the combustion apparatus are operated in the state in which the exhaust gas inlet and outlet are blocked by the blocking means while the branch exhaust passage is released to the atmosphere by the atmospheric air releasing portion. The nitrogen oxide adsorbed to the nitrogen oxide is desorbed by the adsorbed substance desorbing means. The desorbed nitrogen oxide is delivered to the combustion apparatus, and then reduced and removed in the combustion apparatus. The particulate substance captured by the filter apparatus is incinerated and removed by the combustion apparatus. The gas (regenerated gas) generated by the regenerating operation flows in a direction opposite to the exhaust gas flow, and the gas is discharged to the atmosphere through the atmospheric air releasing portion.

As described above, usually the nitrogen oxide adsorbent and the filter apparatus differ from each other in the saturated amount and the regenerating conditions. Accordingly, in the present invention, both the adsorbed substance desorbing means and the combustion apparatus are operated, for example, the regeneration of the nitrogen oxide adsorbent and the regeneration of the filter apparatus are simultaneously performed according to the regenerating conditions of the nitrogen oxide adsorbent, and the adsorbed substance desorbing means can be stopped while only the combustion means is operated to regenerate the filter apparatus in the case where the filter apparatus is insufficiently regenerated due to the difference in regenerating conditions between the nitrogen oxide adsorbent and the filter apparatus or the like. At this point, the particulate substance can be removed efficiently and substantially completely by operating the combustion apparatus according to the regenerating conditions of the filter apparatus. Accordingly, the nitrogen oxide adsorbent and the filter apparatus are appropriately regenerated and maintained without decreasing the purifying ability. In addition, the fuel cost is also saved.

Because the exhaust passage is branched into the plurality of branch exhaust passages, the exhaust gas generated during the normal operation of the internal combustion engine or the like is caused to flow into at least one branch exhaust passage, and the exhaust gas can be blocked in other branch exhaust passages to perform the regenerating operation. The exhaust gas is blocked in the branch exhaust passage in which the regenerating operation is performed, so that the air amount can freely set irrespective of the exhaust gas amount in the adsorbed substance desorbing means and the air supply means of each combustion apparatus. Accordingly, the air amount of the branch exhaust gas passage in the regenerating operation state can be set less independently of the branch exhaust gas passage in the normal operation state, the energy (the fuel flow rate) consumed for desorbing the nitrogen oxide from the nitrogen oxide adsorbent and the fuel flow rate supplied to the combustion apparatus can be set less, and saving of the fuel cost can be achieved.

A fourth aspect according to the invention provides an exhaust gas purifier which is displaced in an exhaust passage of an internal combustion engine or a combustion instrument, the exhaust gas purifier characterized in that the exhaust passage branch exhaust passage is branched into a plurality of branch exhaust passages, blocking means for being able to block gas flow are provided at an exhaust gas inlet and an exhaust gas outlet of the branch exhaust passage, a nitrogen oxide adsorbent, a sulfur oxide adsorbent, an adsorbed substance desorbing means, a combustion apparatus, and an atmospheric air releasing portion are provided between the blocking means at the exhaust gas inlet and exhaust gas outlet of the branch exhaust passage, the nitrogen oxide adsorbent temporarily adsorbing nitrogen oxide and desorbing the adsorbed nitrogen oxide by heating or reducing atmosphere, the sulfur oxide adsorbent being disposed on an exhaust gas upstream side of the nitrogen oxide adsorbent, the sulfur oxide adsorbent temporarily adsorbing sulfur oxide and desorbing the adsorbed sulfur oxide by heating or reducing atmosphere, the adsorbed substance desorbing means being disposed on an exhaust gas downstream side of the nitrogen oxide adsorbent, the adsorbed substance desorbing means including air supply meanwhile heating air from the air supply means or converting the air into a reducing atmosphere, the combustion apparatus being disposed on an exhaust gas upstream side of the nitrogen oxide adsorbent, the combustion apparatus including air supply means, fuel supply means, and ignition means, the atmospheric air releasing portion being disposed on an exhaust gas upstream side of the filter apparatus to open the branch exhaust passage to an atmosphere, and when the adsorbed substance desorbing means and the combustion apparatus are operated to perform a regenerating operation, the exhaust gas inlet and exhaust gas outlet of the branch exhaust passage are blocked by the blocking means, the branch exhaust passage is opened by the atmospheric air releasing portion, and gas generated by the regenerating operation is caused to flow in a direction opposite an exhaust gas flowing direction and discharged from the atmospheric air releasing portion.

According to the fourth aspect of the invention, following working-effects are obtained.

During the normal operation of the internal combustion engine or the like, the adsorbed substance desorbing means and the combustion apparatus are stopped, and the sulfur oxide in the exhaust gas discharged from the internal combustion engine or the like is adsorbed to and removed by the sulfur oxide adsorbent, and the nitrogen oxide is adsorbed to and removed by the nitrogen oxide adsorbent.

Because the sulfur oxide adsorbent is disposed on the exhaust gas upstream of the nitrogen oxide adsorbent, the sulfur oxide hardly flows into the nitrogen oxide adsorbent, and the performance deterioration caused by the poisoning of the sulfur oxide can be suppressed in the nitrogen oxide adsorbent.

In the case where the adsorbing amount of the nitrogen oxide adsorbent or sulfur oxide adsorbent reaches a predetermined amount (for example, saturated amount), the regenerating operation can be performed in each adsorbent. During the regenerating operation, the adsorbed substance desorbing means and the combustion apparatus are operated in the state in which the exhaust gas inlet and outlet are blocked by the blocking means while the branch exhaust passage is released to the atmosphere by the atmospheric air releasing portion. The nitrogen oxide adsorbed to the nitrogen oxide and the sulfur oxide adsorbed to the sulfur oxide adsorbent are desorbed respectively by the adsorbed substance desorbing means. The desorbed nitrogen oxide and sulfur oxide are delivered to the combustion apparatus, and then reduced and removed in the combustion apparatus. The gas (regenerated gas) generated by the regenerating operation flows in the direction opposite to the exhaust gas flow, and the gas is discharged to the atmosphere through the atmospheric air releasing portion. Therefore, the sulfur oxide desorbed from the sulfur oxide adsorbent does not flow into the nitrogen oxide adsorbent, and the performance deterioration caused by the poisoning of the sulfur oxide can be suppressed in the nitrogen oxide adsorbent.

Accordingly, in the present invention, the nitrogen oxide and sulfur oxide in the exhaust gas can properly be removed even in the fuel containing the sulfur component, and the performance of the adsorbent can be maintained without decreasing the purifying ability.

Because the exhaust passage is branched into the plurality of branch exhaust passages, the exhaust gas generated during the normal operation of the internal combustion engine or the like is caused to flow into at least one branch exhaust passage, and the exhaust gas can be blocked in other branch exhaust passages to perform the regenerating operation. The exhaust gas is blocked in the branch exhaust passage in which the regenerating operation is performed, so that the air amount can freely set irrespective of the exhaust gas amount in the adsorbed substance desorbing means and the air supply means of each combustion apparatus. Accordingly, the air amount of the branch exhaust gas passage in the regenerating operation state can be set less independently of the branch exhaust gas passage in the normal operation state, the energy (the fuel flow rate) consumed for desorbing the nitrogen oxide and sulfur oxide from the nitrogen oxide adsorbent and sulfur oxide adsorbent and the fuel flow rate supplied to the combustion region on a downstream side of the adsorbent can be set less, and saving of the fuel cost can be achieved.

In the exhaust gas purifier according to the fourth aspect of the invention, a fifth aspect according to the invention is characterized in that, in each branch exhaust passage, a filter apparatus which can capture a particulate substance contained in the exhaust gas is disposed on the exhaust gas upstream side of the combustion apparatus and on the exhaust gas downstream side of the atmospheric air releasing portion.

According to the fifth aspect of the invention, during the normal operation of the internal combustion engine or the like, the particulate substance contained in the exhaust gas is captured by the filter apparatus, and the particulate substance does not flow into the nitrogen oxide adsorbent and the sulfur oxide adsorbent. Accordingly, the particulate substance has no bad influence on the adsorbing performance of each adsorbent.

In the case where the adsorbed substance desorbing means and the combustion apparatus are operated to perform the regenerating operation, the adsorbed nitrogen oxide and sulfur oxide are desorbed in the nitrogen oxide adsorbent and the sulfur oxide adsorbent, the desorbed nitrogen oxide and sulfur oxide are delivered to the combustion apparatus, and the nitrogen oxide is properly reduced and removed by the combustion apparatus. In the filter apparatus, the captured particulate substance is incinerated and removed by the combustion means.

As described above, usually the nitrogen oxide adsorbent and the sulfur oxide adsorbent differ from the filter apparatus in the saturated amount and the regenerating conditions. Accordingly, in the invention, both the adsorbed substance desorbing means and the combustion apparatus are operated, the regeneration of each adsorbent and the regeneration of the filter apparatus are simultaneously performed according to the regenerating conditions of each adsorbent, and the adsorbed substance desorbing means can be stopped while only the combustion means is operated to regenerate the filter apparatus in the case where the filter apparatus is insufficiently regenerated due to the difference in regenerating conditions between each adsorbent and the filter apparatus or the like. At this point, the particulate substance can efficiently be removed by operating the combustion apparatus according to the regenerating conditions of the filter apparatus. Accordingly, each adsorbent and the filter apparatus are appropriately regenerated and maintained without decreasing the purifying ability. In addition, the fuel cost is also saved.

Effect of the Invention

According to the invention, even in the internal combustion engine or combustion instrument which is operated on the excess air condition, the discharged harmful component can properly be purified.

Particularly, in the first to third aspects of the invention, the nitrogen oxide in the exhaust gas and the particulate substance such as the soot can properly be removed, and the exhaust gas purifier can be maintained without decreasing the purifying ability.

In the fourth and fifth aspects of the invention, the nitrogen oxide, the sulfur oxide, and the like in the exhaust gas can properly be removed even in the fuel containing the sulfur component, and the exhaust gas purifier can be maintained without decreasing the purifying ability.

EXPLANATIONS OF LETTER OR NUMERALS

1 internal combustion engine
2 exhaust passage
2a branch exhaust passage
2b branch exhaust passage
3 adsorbed substance desorbing means
4 nitrogen oxide adsorbent
5 combustion apparatus
6 fuel nozzle (fuel supply means)
7 igniter (ignition means)
15 air supply means
20 upstream-side switching valve
31 fuel nozzle (fuel supply means)
32 igniter (ignition means)
33 air supply means
40 fine particle filter (filter apparatus)
42 sulfur oxide adsorbent
58 downstream-side switching valve
60 atmospheric air releasing portion

BEST MODES FOR CARRYING OUT THE INVENTION

First Embodiment

Figure 1:
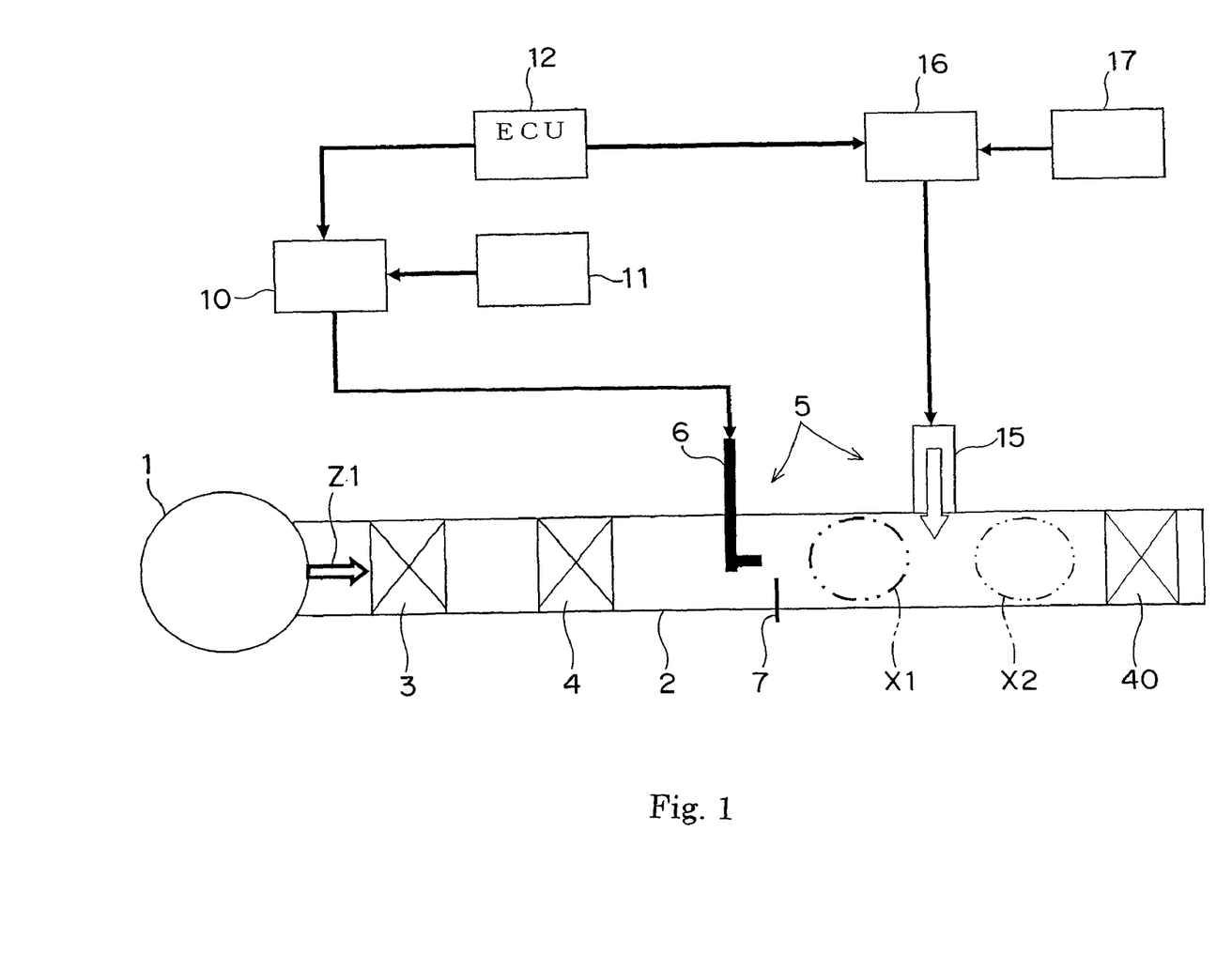
FIG. 1 is a schematic view showing an exhaust gas purifier according to a first embodiment of the invention.

FIG. 1 is a schematic view showing an exhaust gas purifier according to a first embodiment of the invention. The first embodiment is mainly based on the first aspect of the present invention. An exhaust gas purifier is disposed in a single exhaust passage 2 of the internal combustion engine 1 or a combustion instrument. Examples of the internal combustion engine 1 include a diesel engine, a gas engine, a gasoline engine and a gas turbine engine. An example of the combustion instrument includes an industrial boiler and the like.

In the exhaust passage 2, adsorbed substance desorbing means 3, a nitrogen oxide adsorbent 4 (hereinafter referred to as "NOx adsorbent"), a combustion apparatus 5, and a filter apparatus 40 are disposed at predetermined intervals in an exhaust gas flowing direction Z1 in the order from an exhaust gas upstream side.

The combustion apparatus 5 includes air supply means 15, ignition means 7, and fuel supply means 6. The fuel supply means 6 includes a fuel nozzle, and the fuel nozzle 6 is connected to a fuel amount regulating apparatus 10 through a fuel tank 11. In the fuel supply means 6, a supply amount and supply timing of the fuel are controlled by an electronic control unit 12 (hereinafter referred to as "ECU"). The ignition means 7 is formed by an igniter.

The air supply means 15 is disposed on an exhaust gas downstream side of the fuel nozzle 6 and connected to an air supply source 17 through an air amount regulating apparatus 16. In the air amount regulating apparatus 16, the supply amount and supply timing of the fuel are controlled by the ECU 12.

An NOx adsorbent 4 can efficiently and temporarily adsorb nitrogen oxide (hereinafter referred to as "NOx") particularly even under an excess air atmosphere, and has a nature of desorbing the adsorbed NOx at the time of being heated to a predetermined temperature or under a reducing atmosphere. In the present embodiment, the NOx adsorbent 4 includes a catalyst having an oxidation and oxidizes unburned components such as carbon monoxide (hereinafter referred to as "CO") and hydrocarbon (hereinafter referred to as "HC").

For example, heating means for heating the exhaust gas to a predetermined temperature or more is used as the adsorbed substance desorbing means 3. Means for converting the exhaust gas into a reducing atmosphere may be used as the adsorbed substance desorbing means 3. Alternatively, the structure in which reducing agent supply means is added to the heating means is formed, whereby efficiently the NOx and the SOx can efficiently be adsorbed and desorbed. A heat generating resister such as an electric heater is used as the heating means, whereby the temperature is rapidly and securely raised. Further, a fuel supply means can also be provided as another example of the adsorbed substance desorbing means 3. In this case, the supplied fuel plays a role as the reducing agent, and the NOx is desorbed by utilizing the heat generation at the time the supplied fuel is oxidized on the catalyst contained in the NOx adsorbent 4 and having the oxidation.

The filter apparatus 40 is formed by a fine particle filter which can capture the particulate substance included in the exhaust gas. The filter apparatus 40 may have a function of only capturing the particulate substance, and may include a catalyst having an oxidizing operation and have a function of being capable of continuously oxidizing the particulate substance.

(Working-Effect of First Embodiment)

In the structure shown in FIG. 1, the adsorbed substance desorbing means (heating means) 3 and the combustion apparatus 5 are stopped during the normal operation of the internal combustion engine 1. Accordingly, the exhaust gas discharged from the internal combustion engine 1 into the exhaust passage 2 directly reaches the NOx adsorbent 4, and the NOx is adsorbed. At the same time, unburned components such as the CO and the HC are oxidized and detoxified by the oxidizing catalyst contained in the NOx adsorbent 4. Then, the particulate substance included in the exhaust gas is physically captured by the fine particle filter 40, and the purified exhaust gas is discharged from the exhaust passage 2.

In the case where an amount of particulate substance adsorbed to the fine particle filter 40 becomes saturated and the back pressure is increased or an adsorbing amount of NOx adsorbent 4 reaches a predetermined amount (for example, saturated amount), the adsorbed substance desorbing means 3 and the combustion apparatus 5 are operated to regenerate the NOx adsorbent 4 and the fine particle filter 40.

In the adsorbed substance desorbing means 3, the exhaust gas is heated to a predetermined temperature or more on an upstream side of the nitrogen oxide adsorbent 4, and the NOx adsorbent 4 is heated to the predetermined temperature or more, whereby desorbing the NOx adsorbed to the NOx adsorbent 4.

The NOx desorbed from the NOx adsorbent 4 reaches the combustion apparatus 5 on the exhaust gas downstream side. The combustion apparatus 5 causes the igniter 7 to burn the exhaust gas flowing from the adsorbed substance desorbing means 3 with the fuel supplied from the fuel nozzle 6, thereby forming an over-rich combustion region X1 on the exhaust gas upstream side of the air supply means 15. In the over-rich combustion region X1, the NOx desorbed from the NOx adsorbent 4 is reduced and removed. That is, the NOx is detoxified to $N_2$ and discharged.

The combustion apparatus 5 also forms a lean fuel combustion region X2 on the exhaust gas downstream side of the air supply means 15 by the air supplied from the air supply means 15. the CO, the HC, and the particulate substance which are discharged from the internal combustion engine 1 and over-rich combustion region X1 are burned and removed in the lean fuel combustion region X2.

The exhaust gas and regenerated gas passing through the combustion apparatus 5 are always pass through the over-rich combustion region X1 and lean fuel combustion region X2, because the regions X1 and X2 are formed across the whole section of the exhaust passage 2. Accordingly, the NOx is surely reduced and removed, and the CO, the HC, and the particulate substance which are discharged from the internal combustion engine 1 and over-rich combustion region X1 are surely burned and removed.

The particulate substance captured by the fine particle filter 40 is incinerated and removed by the burning of the combustion apparatus 5. At this point, the NOx adsorbent 4 and the fine particle filter 40 usually differ from each other in regenerating conditions such as a regenerating time and a temperature. For example, although an upper limit of the temperature rise in the NOx adsorbent 4 is restricted due to deterioration caused by heat, sometimes the fine particle filter 40 can be regenerated at temperatures higher than the upper limit temperature. The NOx adsorbent 4 and the fine particle filter 40 differ from each other in a saturated amount. Accordingly, when the regenerating operation is performed under the condition in which the NOx adsorbent is regenerated, sometimes the fine particle filter 40 is insufficiently regenerated even if the NOx adsorbent 4 is regenerated.

In such cases, in the first embodiment, while the adsorbed substance desorbing means 3 is stopped, only the combustion apparatus 5 can be operated to regenerate only the fine particle filter 40. Because the single regenerating operation of the fine particle filter 40 has no heat influence on the NOx adsorbent 4, the combustion apparatus 5 can be operated at a high temperature according to the regenerating conditions of the fine particle filter 40. Accordingly, the particulate substance can efficiently be burned and removed, and the fuel consumption becomes lessened.

In the case where the SOx is contained in the exhaust gas, the SOx is desorbed from the NOx adsorbent 4 using a material to which the SOx is hardly adsorbed, or the NOx adsorbent 4 is heated to an SOx desorbing temperature even if the SOx is adsorbed, and the SOx is desorbed from the NOx adsorbent 4 using the reducing atmosphere if needed.

Second Embodiment

Figure 2:
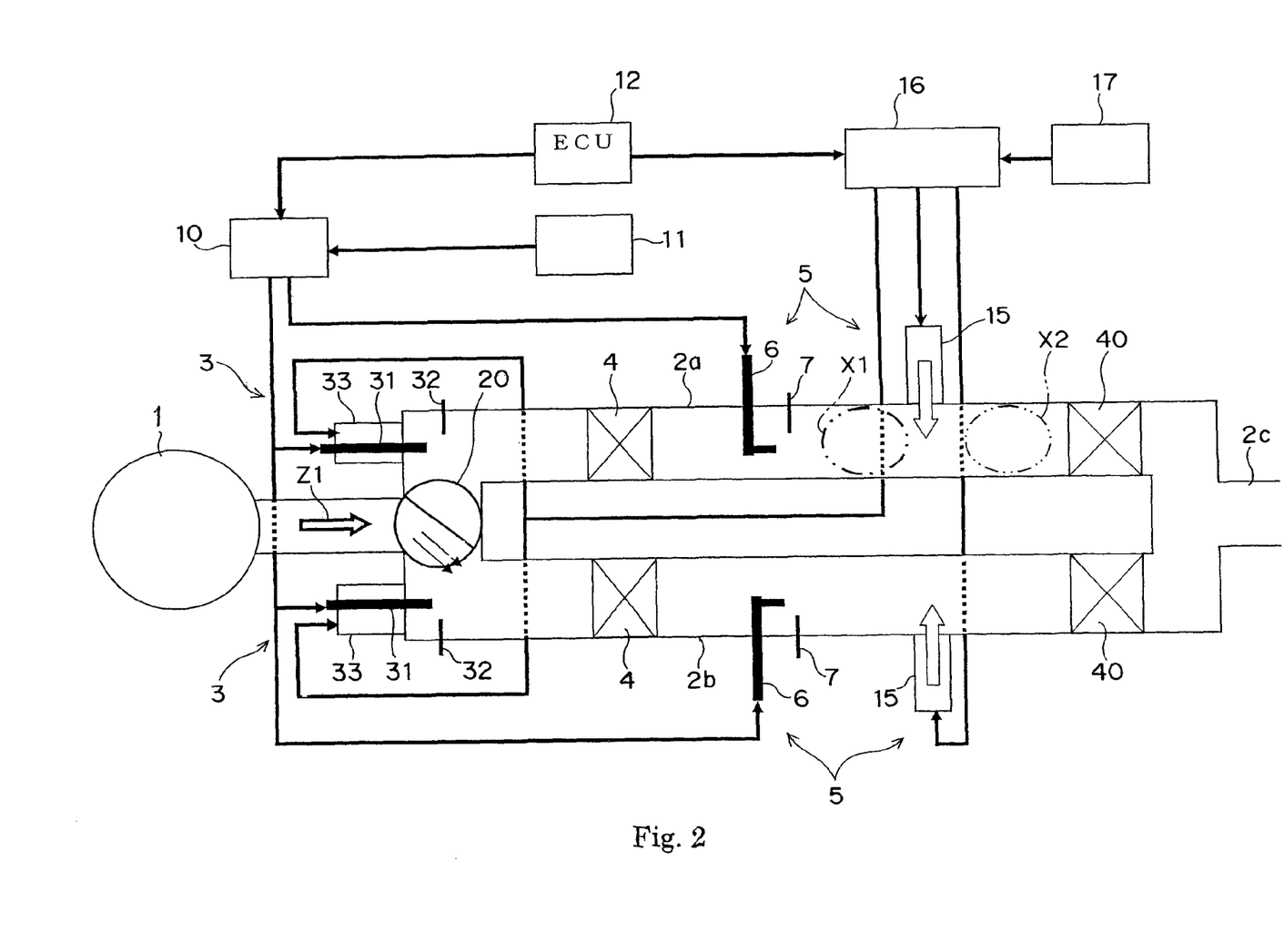
FIG. 2 is a schematic view showing an exhaust gas purifier according to a second embodiment of the invention.

FIG. 2 is a schematic view showing an exhaust gas purifier according to a second embodiment of the invention. The second embodiment is mainly based on the second aspect of the invention. In the exhaust gas purifier of the present embodiment, the exhaust passage 2 is branched into a plurality of branch exhaust passages 2a and 2b, e.g., first and second branch exhaust passages 2a and 2b. The two branch exhaust passages 2a and 2b are merged again on the exhaust gas downstream side and connected to a downstream-side exhaust passage 2c.

A switching valve 20 is provided in a branch portion on an upstream side of the two branch exhaust passages 2a and 2b. The exhaust gas from the internal combustion engine 1 can selectively be discharged to one of the branch exhaust passages 2a and 2b by switching the switching valve 20. The switching valve 20 constitutes blocking means for blocking the flow of the exhaust gas at an exhaust gas inlet of the branch exhaust passages 2a and 2b.

As with the first embodiment, in each of the branch exhaust passages 2a and 2b, the adsorbed substance desorbing means 3, the NOx adsorbent 4, the combustion apparatus 5, and the filter apparatus 40 are disposed in the order from the exhaust gas upstream side. The configurations of the NOx adsorbent 4, combustion apparatus 5, and filter apparatus 40 are similar to those of the first embodiment.

The adsorbed substance desorbing means 3 of the second embodiment includes an air supply means 33 to heat the air from the air supply means 33 or to change the air into the reducing atmosphere. Specifically, the adsorbed substance desorbing means 3 includes an adsorbed substance desorbing apparatus which is formed by the air supply means 33, a fuel supply means 31, and an ignition means 32. The fuel supply means 31 includes the fuel nozzle, and is connected to the fuel amount regulating apparatus 10. The air supply means 33 is connected to the air amount regulating apparatus 16, and the ignition means 32 is formed by the igniter.

(Working-Effect of Second Embodiment)

In the case where the internal combustion engine 1 is operated, the switching valve 20 switches the exhaust gas passages to utilize one of the branch exhaust passages 2a and 2b as the exhaust gas discharge passage of the internal combustion engine 1. In the state of FIG. 2, the second branch exhaust passage 2b is used as the exhaust gas passage, while the first branch exhaust passage 2a is used for the regenerating operation.

In the state of FIG. 2, in the second branch exhaust passage 2b in the normal operation state, the combustion apparatus 5 and the adsorbed substance desorbing means 3 are stopped, the NOx in the exhaust gas is adsorbed to the NOx adsorbent 4, and the particulate substance is captured by the fine particle filter 40. On the other hand, in the first branch exhaust passage 2a in the regenerating operation state, the combustion apparatus 5 and the adsorbed substance desorbing means 3 are operated, the adsorbed substance desorbing means 3 burns the fuel from the fuel nozzle 31 with the air from the air supply means 33 to supply the high-temperature regenerated gas to the NOx adsorbent 4, the NOx is desorbed from the NOx adsorbent 4, and the NOx is reduced and removed in the over-rich combustion region X1 of the combustion apparatus 5.

The exhaust gas is blocked from the internal combustion engine 1 in the first branch exhaust passage 2a in the regenerating operation state, and the first branch exhaust passage 2a in the regenerating operation state is operated independently of the second branch exhaust passage 2b in the normal operation state, and the regenerating operation is performed by the fuel and air supplied from the adsorbed substance desorbing means 3 and combustion apparatus 5 in the first branch exhaust passage 2a. Therefore, the amount of air used for the adsorbed substance desorption and the combustion apparatus is properly set irrespective of the exhaust gas amount from the internal combustion engine 1, so that the amount of fuel supplied from the adsorbed substance desorbing means 3 and the amount of fuel supplied in the combustion apparatus 5 can be saved.

When the NOx absorbing amount of the NOx adsorbent 4 in the second branch exhaust passage 2b reaches a predetermined amount (for example, saturated amount), the switching valve 20 is switched to the first branch exhaust passage 2a, and the combustion apparatus 5 and adsorbed substance desorbing means 3 in the second branch exhaust passage 2b are operated while the combustion apparatus 5 and adsorbed substance desorbing means 3 in the first branch exhaust passage 2a are stopped. That is, the normal operation is performed in the first branch exhaust passage 2a, and the regenerating operation is simultaneously performed in the second branch exhaust passage 2b.

Thus, in the second embodiment, the normal operation of the internal combustion engine 1 can be performed by utilizing the one branch exhaust passage while the regenerating operation is performed in the other branch exhaust passage, thereby eliminating the particular time required for the regenerating operation.

Third Embodiment

Figure 3:
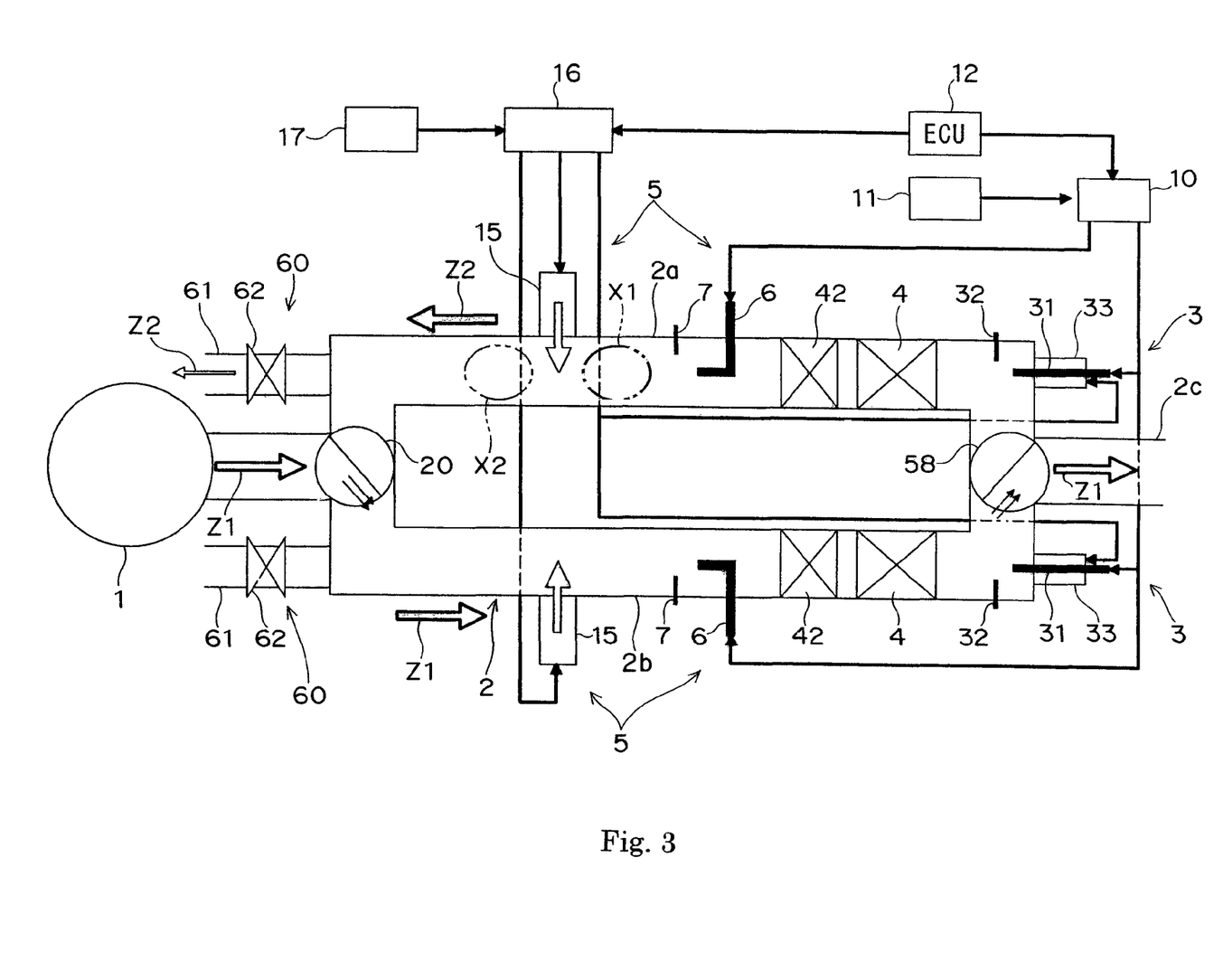
FIG. 3 is a schematic view showing an exhaust gas purifier according to a third embodiment of the invention.

FIG. 3 is a schematic view showing an exhaust gas purifier according to a third embodiment of the invention. The third embodiment is mainly based on the fourth aspect of the invention. As with the first and second embodiments, the exhaust gas purifier is provided in the exhaust passage 2 of the internal combustion engine 1 or combustion instrument.

The exhaust passage 2 is branched into a plurality of branch exhaust passages 2a and 2b. In the third embodiment, the exhaust passage 2 is branched into the first and second branch exhaust passages 2a and 2b, and the two branch exhaust passages 2a and 2b are merged again on the exhaust gas downstream side and connected to the downstream-side exhaust passage 2c.

An upstream-side switching valve 20 is provided in a branch portion on the upstream side of the two branch exhaust passages 2a and 2b, and a downstream-side switching valve 58 is provided in a branch portion on the downstream side. The exhaust gas from the internal combustion engine 1 can selectively be discharged to one of the branch exhaust passages 2a and 2b by switching the upstream-side switching valve 20. The downstream-side switching valve 58 prevents the exhaust gas from flowing into the branch exhaust passage 2a through a merging portion while connecting the branch exhaust passage 2b through which the exhaust gas flows to the downstream-side exhaust passage 2c. The upstream-side switching valve 20 and the downstream-side switching valve 58 constitute blocking means for blocking the flow of the exhaust gas or regenerated gas at the exhaust gas inlet or outlet of the branch exhaust passages 2a and 2b.

In each of the branch exhaust passages 2a and 2b, the adsorbed substance desorbing means 3, the nitrogen oxide adsorbent 4 (hereinafter referred to as "NOx adsorbent"), the sulfur oxide adsorbent 42 (hereinafter referred to as "SOx adsorbent"), and the combustion apparatus 5 are disposed at intervals in the exhaust gas flowing direction Z1 in the order from the exhaust gas downstream side.

As with the first embodiment, the combustion apparatus 5 includes the air supply means 15, the ignition means 7, and the fuel supply means 6. The fuel supply means 6 includes the fuel nozzle, and the fuel nozzle 6 is connected to the fuel tank 11 through the fuel amount regulating apparatus 10. The supply amount and supply timing of the fuel are controlled by the electronic control unit 12 (hereinafter referred to as "ECU"). The ignition means 7 includes the igniter.

The air supply means 15 is disposed on the exhaust gas upstream side of the fuel nozzle 6 and connected to the air supply source 17 through the air amount regulating apparatus 16. In the air amount regulating apparatus 16, the supply amount and supply timing of the fuel are controlled by the ECU 12.

Particularly the NOx adsorbent 4 can efficiently and tentatively adsorb the nitrogen oxide (hereinafter referred to as "NOx") even in the excess air atmosphere, and the NOx adsorbent 4 desorbs the adsorbed NOx in a predetermined increased temperature or in the reducing atmosphere. In the present embodiment, the NOx adsorbent 4 includes a catalyst having oxidation, and the NOx adsorbent 4 oxidizes the unburned components such as the carbon monoxide (hereinafter referred to as "CO") and the hydrocarbon (hereinafter referred to as "HC"). The NOx adsorbent 4 is formed in the shape in which the particulate substance is easily captured.

An SOx adsorbent 42 tentatively adsorbs an SOx, and the SOx adsorbent 42 desorbs the adsorbed SOx in a predetermined increased temperature or in the reducing atmosphere.

The adsorbed substance desorbing means 3 includes the air supply means 33 to heat the air from the air supply means 33 or to change the air into the reducing atmosphere. Specifically, the adsorbed substance desorbing means 3 includes an adsorbed substance desorbing apparatus which is formed by the air supply means 33, the fuel supply means 31, and the ignition means 32. The fuel supply means 31 includes the fuel nozzle, and the fuel supply means 31 is connected to the fuel amount regulating apparatus 10. The air supply means 33 is connected to the air amount regulating apparatus 16, and the ignition means 32 is formed by the igniter.

In each of the branch exhaust passages 2a and 2b, an atmospheric air releasing portion 60 is provided on the exhaust gas upstream side of the combustion apparatus 5. The atmospheric air releasing portion 60 includes an atmospheric air releasing passage 61 connected to the branch exhaust passage 2a or 2b and an opening and closing valve 62 provided in the atmospheric air releasing passage 61. Each of the branch exhaust passage 2a and 2b is released into the atmosphere through the atmospheric air releasing passage 61 by opening the opening and closing valve 62, and each of the branch exhaust passage 2a and 2b is blocked from the atmosphere by closing the opening and closing valve 62.

(Working-Effect of Third Embodiment)

During the normal operation of the internal combustion engine 1, the exhaust gas is discharged to one of the branch exhaust passage 2a or 2b selected by the upstream-side switching valve 20 and the downstream-side switching valve 58. In example of FIG. 3, the exhaust gas is discharged to the second branch exhaust passage 2b. At this point, the adsorbed substance desorbing means 3 and combustion apparatus 5 provided in the second branch exhaust passage 2b are stopped.

The exhaust gas flows into the SOx adsorbent 42, and the SOx contained in the exhaust gas is adsorbed to the exhaust SOx adsorbent 42. Then, the exhaust gas flows into the NOx adsorbent 4, NOx contained in the exhaust gas is adsorbed to the exhaust NOx adsorbent 4, and the exhaust gas is discharged through the downstream-side switching valve 58 and the downstream-side exhaust passage 2c. In the NOx adsorbent 4, the unburned component such as the CO and the HC is oxidized and detoxified by the oxidizing catalyst, and the particulate substance is physically captured.

On the other hand, in the first branch exhaust passage 2a, the exhaust gas of the internal combustion engine 1 is blocked, and the regenerating operation can be performed in the NOx adsorbent 4 and SOx adsorbent 42 disposed in the first branch exhaust passage 2a while the normal operation is operated in the internal combustion engine 1.

The adsorbed substance desorbing means 3 and the combustion apparatus 5 are operated while the opening and closing valve 62 of the atmospheric air releasing portion 60 is opened, thereby performing the regenerating operation.

In the adsorbed substance desorbing means 3, the fuel supplied from the fuel nozzle 31 is burned with the air from the air supply means 33, and the high-temperature regenerated gas is supplied to the NOx adsorbent 4 and the SOx adsorbent 42. This enables the NOx and the SOx to be desorbed from the NOx adsorbent 4 and the SOx adsorbent 42.

In the combustion apparatus 5, the fuel supplied from the fuel nozzle 6 is burned by the igniter 7 using the regenerated gas flowing from the adsorbed substance desorbing means 3, and the over-rich combustion region X1 is formed on the exhaust gas downstream side of air supply means 15. The NOx desorbed from the NOx adsorbent 4 is reduced and removed in the over-rich combustion region X1. In the combustion apparatus 5, the lean fuel combustion region X2 is formed on the exhaust gas upstream side of the air supply means 15 by the air supplied from the air supply means 15. The CO, the HC, and the particulate substance which are discharged from the over-rich combustion region X1 are burned and removed in the lean fuel combustion region X2. Then, the regenerated gas is discharged to the atmosphere through the atmospheric air releasing portion 60.

Accordingly, in the regenerating operation, the flow (arrow Z2) of the regenerated gas is generated in the direction opposite the exhaust gas flow direction Z1.

In the second branch exhaust passage 2b through which the exhaust gas of the normal operation flows, in the case where the adsorbed amount of NOx adsorbent 4 or SOx adsorbent 42 reaches a predetermined amount (for example, saturated amount), the upstream-side switching valve 20 and the downstream-side switching valve 58 are switched to discharge the exhaust gas to the first branch exhaust passage 2a, and the regenerating operation is similarly performed in the second branch exhaust passage 2b.

During the normal operation, because the SOx contained in the exhaust gas is adsorbed to the SOx adsorbent 42 before the SOX reaches the NOx adsorbent 4, the SOx is prevented from poisoning the NOx adsorbent 4. During the regenerating operation, because the SOx desorbed from the SOx adsorbent 42 flows onto the combustion apparatus 5 without flowing into the NOx adsorbent 4, the SOx is prevented from poisoning the NOx adsorbent 4. That is, in the present embodiment, the exhaust gas flow and the regenerated gas flow are reversed each other to prevent the SOx from flowing into the NOx adsorbent 4 in both the normal operation and the regenerating operation, and the deterioration of performance can be prevented in the NOx adsorbent 4.

In the combustion apparatus 5, because the over-rich combustion region X1 and the lean fuel combustion region X2 are formed across the whole sections of the branch exhaust passages 2a and 2b, the regenerated gas passing through the combustion apparatus 5 always passes through the regions X1 and X2. Accordingly, the NOx and the SOx are surely reduced and removed, and the CO, the HC, and the particulate substance from the over-rich combustion region X1 are surely burned and removed.

The regenerating operations of the NOx adsorbent 4 and SOx adsorbent 42 are independently performed by the fuel supplies and air supplies from the adsorbed substance desorbing means 3 and combustion apparatus 5 in the branch exhaust passage in which the exhaust gas of the internal combustion engine 1 is blocked. Therefore, the amount of air for the adsorbed substance desorption and combustion apparatus is set irrespective of the amount of exhaust gas from the internal combustion engine 1, so that the amount of fuel supplied from the adsorbed substance desorbing means 3 and the amount of fuel supplied in the combustion apparatus can be saved.

In the third embodiment, the normal operation of the internal combustion engine 1 can be performed by utilizing one of the branch exhaust passages while the regenerating operation is performed in the other branch exhaust passage, thereby eliminating the particular time required for the regenerating operation. Additionally, the switching valves 20 and 58 are used as the blocking means for blocking the exhaust gas inlet and outlet of the branch exhaust passage, one of the branch exhaust passages is easily blocked from the exhaust gas, and the exhaust gas can easily be caused to flow into the other branch exhaust passage at the same time.

Fourth Embodiment

Figure 4:
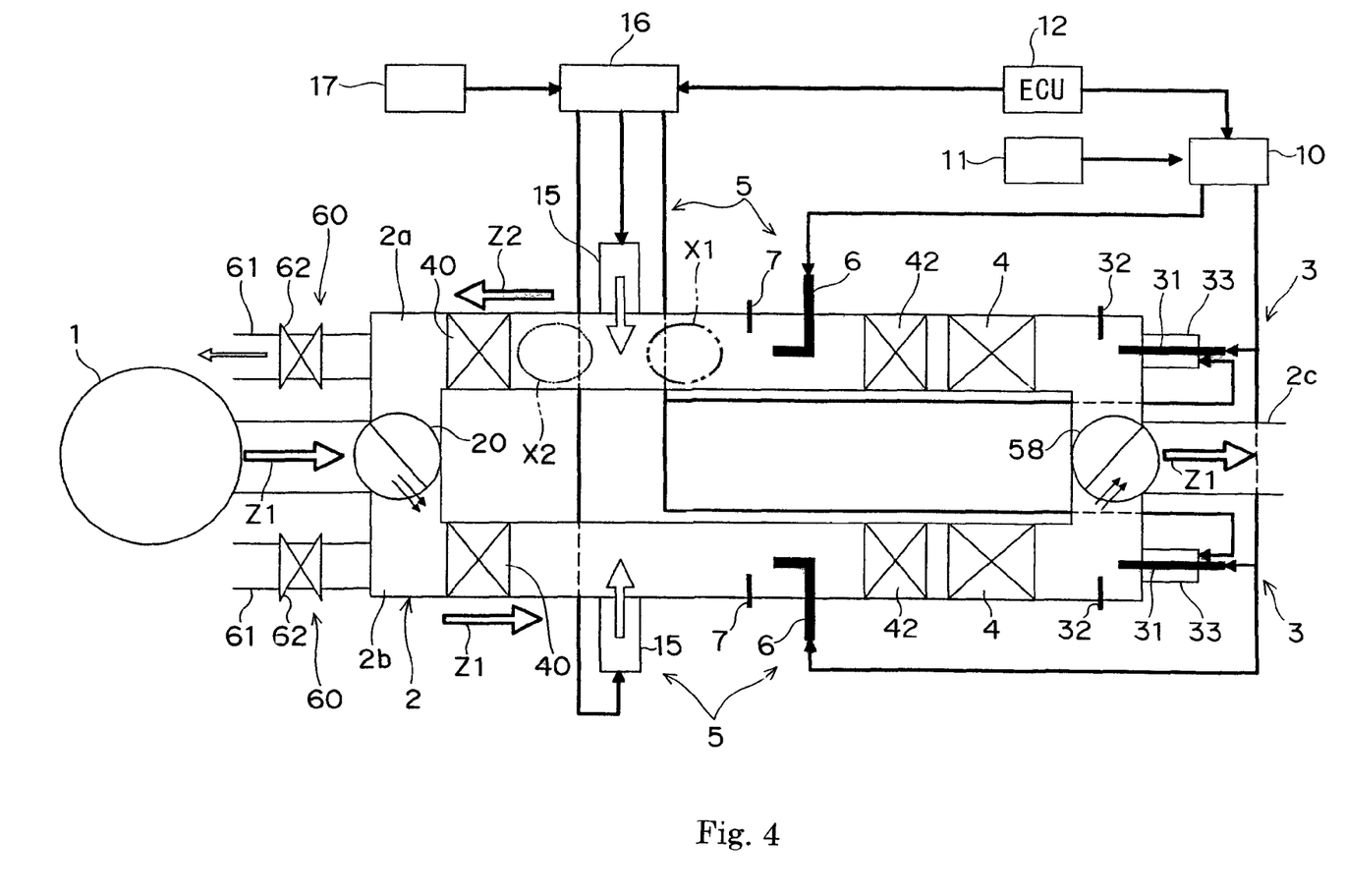
FIG. 4 is a schematic view showing an exhaust gas purifier according to a fourth embodiment of the invention.

FIG. 4 is a schematic view showing an exhaust gas purifier according to a fourth embodiment of the invention. The present embodiment is mainly based on the fifth aspect of the invention. In the fourth embodiment, the filter apparatus 40 is provided to the exhaust gas purifier of the third embodiment to capture the particulate substance contained in the exhaust gas. The configurations of the fourth embodiment are similar to those of the third embodiment. The filter apparatus 40 is formed by the fine particle filter disposed on the exhaust gas upstream side of the combustion apparatus 5 between the switching valves 20 and 58 in each of the branch exhaust passages 2a and 2b.

The working of the present embodiment is substantially similar to that of the third embodiment. However, during the normal operation, the particulate substance contained in the exhaust gas is captured by the fine particle filter 40 before the particulate substance flows into the SOx adsorbent 42 and the NOx adsorbent 4. Accordingly, the SOx adsorbent 42 and the NOx adsorbent 4 are hardly clogged with the particulate substance, so that the decrease in adsorption of each adsorbent can be prevented.

During the normal operation, when the amount of particulate substance adsorbed to the fine particle filter 40 becomes the saturated state to increase the background pressure, or when the amount of adsorbed NOx or SOx reaches the predetermined amount (for example, saturated amount), the normal operation is switched to the regenerating operation. During the regenerating operation, the particulate substance captured by the fine particle filter 40 is mainly incinerated and removed to regenerate the fine particle filter 40 by the burning of the combustion apparatus 5.

As described in the first embodiment, the NOx adsorbent 4 and the SOx adsorbent 42 usually differ from the fine particle filter 40 in the regenerating conditions such as the regenerating time and the temperature and the saturated amount. For example, although the upper limit of the temperature rise in the NOx adsorbent 4 is restricted due to deterioration caused by heat, sometimes the fine particle filter 40 can be regenerated at temperatures higher than the upper limit temperature. Accordingly, when the regenerating operation is performed under the conditions of each of the adsorbents 4 and 42, sometimes the fine particle filter 40 is insufficiently regenerated even if the regeneration of adsorbent 4 or 42 is regenerated. In such cases, while the adsorbed substance desorbing means 3 is stopped, only the combustion apparatus 5 can be operated to regenerate only the fine particle filter 40. Because the single regenerating operation of the fine particle filter 40 has no heat influence on the NOx adsorbent 4 and the like, the combustion apparatus 5 can be operated at a high temperature according to the regenerating conditions of the fine particle filter 40. Therefore, the particulate substance can be burned and removed efficiently and substantially completely, and the wasted consumption of the fuel is eliminated.

The filter apparatus 40 may have a function of only capturing the particulate substance, and the filter apparatus 40 may include a catalyst having the oxidation and have a function of being capable of continuously oxidizing the particulate substance.

Fifth Embodiment

Figure 5:
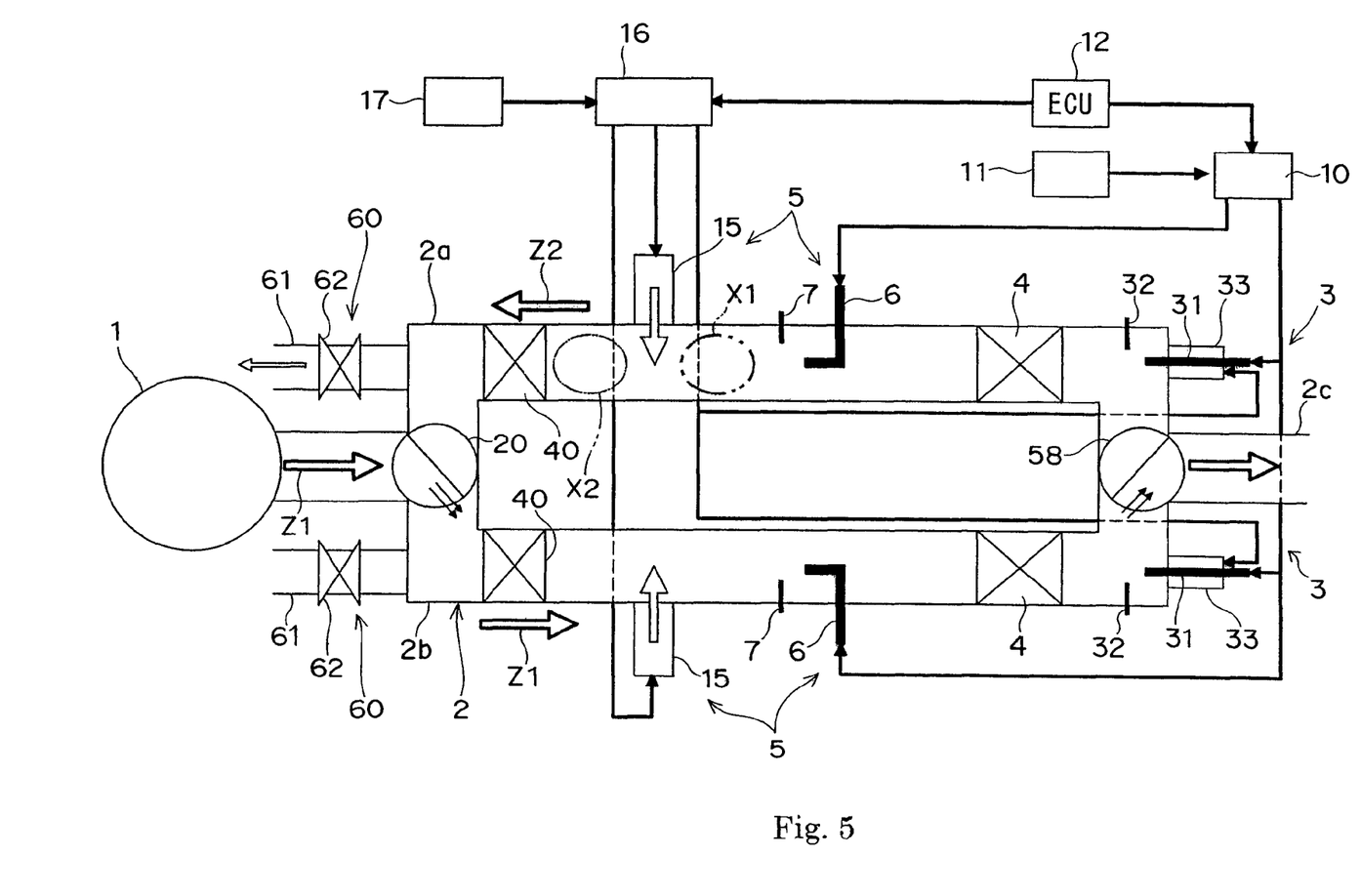
FIG. 5 is a schematic view showing an exhaust gas purifier according to a fifth embodiment of the invention.

FIG. 5 is a schematic view showing an exhaust gas purifier according to a fifth embodiment of the invention. The present embodiment is mainly based on the third aspect of the invention. The SOx adsorbent 42 of the fourth embodiment is neglected in the fifth embodiment. Other configurations of the fifth embodiment are similar to those of the fourth embodiment. Accordingly, the fifth embodiment has similar working effects except for that associated with the SOx adsorbent of the fourth embodiment.

During the normal operation, the particulate substance contained in the exhaust gas is captured by the fine particle filter 40 before flowing into the NOx adsorbent 4. Accordingly, the NOx adsorbent 4 is hardly clogged with the particulate substance, and the decrease in adsorption of NOx adsorbent can be prevented.

During the normal operation, when the amount of particulate substance adsorbed to the fine particle filter 40 becomes the saturated state to increase the background pressure, or when the amount of adsorbed NOx or SOx reaches the predetermined amount (for example, saturated amount), the normal operation is switched to the regenerating operation as described above. During the regenerating operation, the particulate substance captured by the fine particle filter 40 is mainly incinerated and removed to regenerate the fine particle filter 40 by the burning of the combustion apparatus 5.

In the case where the regeneration of the NOx adsorbent 4 is completed while the regeneration of the fine particle filter 40 is not completed because of the difference in regenerating condition between the NOx adsorbent 4 and the fine particle filter 40, the adsorbed substance desorbing means 3 is stopped, and only the combustion apparatus 5 is operated to regenerated only the fine particle filter 40. Because the single regeneration of the fine particle filter 40 has no influence on the NOx adsorbent 4 and the like, the combustion apparatus 5 can be operated according to the regenerating conditions of the fine particle filter 40. Therefore, the particulate substance can efficiently be removed, and the wasted consumption of the fuel is eliminated.

Other Embodiments

On the second to fifth embodiments, the exhaust passage can be branched into three or more branch exhaust passages. In such cases, the exhaust gas may be caused to flow in one of the branch exhaust passages while the regenerating operation is performed in other branch exhaust passages, or the regenerating operation may be performed in one of the branch exhaust passages while the exhaust gas is caused to flow in other branch exhaust passages.

INDUSTRIAL APPLICABILITY

The invention is utilized as the exhaust gas purifier of the various internal combustion engines such as the diesel engine, the gas engine, the gasoline engine, and the gas turbine engine or the like, or the exhaust gas purifier of the fuel instruments such as the industrial boiler or the like. Particularly, the invention is suitable to the internal combustion engine in which the large amount of the NOx is contained in the exhaust gas like the internal combustion engine operated with the lean burn. The invention is also applicable to the industrial diesel engine and the like in which the SOx is contained. Additionally, the invention is suitable to the case in which the heat of the exhaust gas is reused, and the poisoning of the SOx can be lessened to efficiently recover the exhaust heat.

The invention claimed is:

1. An exhaust gas purifier being displaced in an exhaust passage of an internal combustion engine or a combustion instrument, in the exhaust passage, the exhaust gas purifier comprising:
 a nitrogen oxide adsorbent temporarily adsorbing nitrogen oxide and desorbing the adsorbed nitrogen oxide by heating or reducing atmosphere;
 adsorbed substance desorbing means being disposed on an exhaust gas upstream side of the nitrogen oxide adsorbent, the adsorbed substance desorbing means heating the exhaust gas or air or converting the exhaust gas or air into a reducing atmosphere;
 a combustion apparatus being disposed on an exhaust gas downstream side of the nitrogen oxide adsorbent, the combustion apparatus including air supply means, fuel supply means, and ignition means; and
 a filter apparatus being disposed on an exhaust gas downstream side of the combustion apparatus to be able to capture a particulate substance contained in the exhaust gas;
 a plurality of branch exhaust passages branched from the exhaust passage; and
 blocking means for being able to block gas flow is provided in an exhaust gas inlet of each branch exhaust passage,
 wherein each branch exhaust passage includes the nitrogen oxide adsorbent, the adsorbed substance desorbing means, the combustion apparatus and the filter apparatus, and
 the adsorbed substance desorbing means includes air supply means and the adsorbed substance desorbing means is configured to heat air from the air supply means or to convert the air into the reducing atmosphere.

2. An exhaust gas purifier being displaced in an exhaust passage of an internal combustion engine or a combustion instrument, the exhaust gas purifier characterized in that the exhaust passage branch exhaust passage is branched into a plurality of branch exhaust passages,
 blocking means for being able to block gas flow are provided at an exhaust gas inlet and an exhaust gas outlet of the branch exhaust passage,
 a nitrogen oxide adsorbent, a adsorbed substance desorbing means, a combustion apparatus, a filter apparatus, and an atmospheric air releasing portion are provided between the blocking means at the exhaust gas inlet and exhaust gas outlet of the branch exhaust passage,
 the nitrogen oxide adsorbent temporarily adsorbing nitrogen oxide and desorbing the adsorbed nitrogen oxide by heating or reducing atmosphere,
 the adsorbed substance desorbing means being disposed on an exhaust gas downstream side of the nitrogen oxide adsorbent, the adsorbed substance desorbing means including air supply means, the adsorbed substance desorbing means heating air from the air supply means or converting the air into a reducing atmosphere,
 the combustion apparatus being disposed on an exhaust gas upstream side of the nitrogen oxide adsorbent, the combustion apparatus including air supply means, fuel supply means, and ignition means,
 the filter apparatus being disposed on an exhaust gas upstream side of the combustion apparatus to be able to capture a particulate substance contained in the exhaust gas,
 the atmospheric air releasing portion being disposed on an exhaust gas upstream side of the filter apparatus to open the branch exhaust passage to an atmosphere, and
 when the adsorbed substance desorbing means and the combustion apparatus are operated to perform a regenerating operation, the exhaust gas inlet and exhaust gas outlet of the branch exhaust passage are blocked by the blocking means, the branch exhaust passage is opened by the atmospheric air releasing portion, and gas generated by the regenerating operation is caused to flow in a direction opposite an exhaust gas flowing direction and discharged from the atmospheric air releasing portion.

3. An exhaust gas purifier being displaced in an exhaust passage of an internal combustion engine or a combustion instrument, the exhaust gas purifier characterized in that the exhaust passage branch exhaust passage is branched into a plurality of branch exhaust passages,
 blocking means for being able to block gas flow are provided at an exhaust gas inlet and an exhaust gas outlet of the branch exhaust passage,
 a nitrogen oxide adsorbent, a sulfur oxide adsorbent, an adsorbed substance desorbing means, a combustion apparatus, a filter apparatus, and an atmospheric air releasing portion are provided between the blocking means at the exhaust gas inlet and exhaust gas outlet of the branch exhaust passage,
 the nitrogen oxide adsorbent temporarily adsorbing nitrogen oxide and desorbing the adsorbed nitrogen oxide by heating or reducing atmosphere,
 the sulfur oxide adsorbent being disposed on an exhaust gas upstream side of the nitrogen oxide adsorbent, the sulfur oxide adsorbent temporarily adsorbing sulfur oxide and desorbing the adsorbed sulfur oxide by heating or reducing atmosphere,
 the adsorbed substance desorbing means being disposed on an exhaust gas downstream side of the nitrogen oxide adsorbent, the adsorbed substance desorbing means including air supply means, the adsorbed substance desorbing means heating air from the air supply means or converting the air into a reducing atmosphere,
 the combustion apparatus being disposed on an exhaust gas upstream side of the nitrogen oxide adsorbent, the combustion apparatus including air supply means, fuel supply means, and ignition means,
 the atmospheric air releasing portion being disposed on an exhaust gas upstream side of the combustion apparatus to open the branch exhaust passage to an atmosphere, and
 when the adsorbed substance desorbing means and the combustion apparatus are operated to perform a regenerating operation, the exhaust gas inlet and exhaust gas outlet of the branch exhaust passage are blocked by the blocking means, the branch exhaust passage is opened by the atmospheric air releasing portion, and gas generated by the regenerating operation is caused to flow in a direction opposite an exhaust gas flowing direction and discharged from the atmospheric air releasing portion.

4. The exhaust gas purifier according to claim 3, characterized in that, in each branch exhaust passage, a filter apparatus which can capture a particulate substance contained in the exhaust gas is disposed on the exhaust gas upstream side of the combustion apparatus and on the exhaust gas downstream side of the atmospheric air releasing portion.

* * * * *